United States Patent
Brockhoff (10) Patent No.: US 7,594,685 B2
(45) Date of Patent: Sep. 29, 2009

(54) CONVERTIBLE VEHICLE WITH A MOVABLE REAR SHELF

(75) Inventor: Franz-Ulrich Brockhoff, Bramsche (DE)

(73) Assignee: Wilheim Karmann GmbH, Osnabruek (DE)

( * ) Notice: Subject to any disclaimer, the term of this patent is extended or adjusted under 35 U.S.C. 154(b) by 30 days.

(21) Appl. No.: 11/722,536

(22) PCT Filed: Dec. 3, 2005

(86) PCT No.: PCT/DE2005/002187
§ 371 (c)(1),
(2), (4) Date: Jul. 2, 2007

(87) PCT Pub. No.: WO2006/066537
PCT Pub. Date: Jun. 29, 2006

(65) Prior Publication Data
US 2008/0203758 A1    Aug. 28, 2008

(30) Foreign Application Priority Data
Dec. 22, 2004    (DE)    ........................ 10 2004 061 775

(51) Int. Cl.
*B60J 7/20* (2006.01)
(52) U.S. Cl. ................................................. 296/24.44
(58) Field of Classification Search .............. 296/24.44, 296/107.07, 107.08
See application file for complete search history.

(56) References Cited

U.S. PATENT DOCUMENTS

| | | | | |
|---|---|---|---|---|
| 5,921,608 A | * | 7/1999 | Schmitt et al. | 296/107.08 |
| 6,318,792 B1 | * | 11/2001 | Neubrand et al. | 296/107.08 |
| 6,364,396 B1 | * | 4/2002 | Hayashi et al. | 296/136.06 |
| 6,454,343 B1 | * | 9/2002 | Wagner et al. | 296/107.08 |
| 6,682,149 B1 | * | 1/2004 | Guillez et al. | 296/108 |
| 7,032,947 B2 | * | 4/2006 | Queveau et al. | 296/24.44 |
| 7,216,916 B2 | * | 5/2007 | Czerwinski et al. | 296/66 |
| 7,316,438 B2 | * | 1/2008 | Queveau et al. | 296/24.43 |
| 7,367,607 B2 | * | 5/2008 | Roeder et al. | 296/107.08 |
| 2002/0041109 A1 | * | 4/2002 | Wagner et al. | 296/107.08 |
| 2003/0020298 A1 | * | 1/2003 | Koch | 296/107.08 |
| 2003/0098593 A1 | * | 5/2003 | Holst et al. | 296/107.08 |
| 2005/0248171 A1 | * | 11/2005 | Guillez et al. | 296/24.44 |

FOREIGN PATENT DOCUMENTS

EP    0949105 A1    10/1999

* cited by examiner

*Primary Examiner*—H Gutman
(74) *Attorney, Agent, or Firm*—Quinn Law Group, PLLC.; Christopher W. Quinn (57) ABSTRACT

A convertible vehicle with a roof that can be stowed in the rear area of the vehicle, wherein when the roof is closed, an area in front of the rear roof seal relative to the direction of travel and below a rear window can be at least partially covered by a cover in the manner of a rear shelf, the cover being recessed when the roof is opened. The cover comprises a center section and outer sections situated to its sides in relation to the transverse direction of the vehicle, which, when the roof is open, are folded in relative to the center section in an at least nearly opposite orientation.

15 Claims, 15 Drawing Sheets

CONVERTIBLE VEHICLE WITH A MOVABLE REAR SHELF

CROSS-REFERENCE TO RELATED APPLICATION(S)

This application is a US National Phase of International Application No. PCT/DE 2005/002187, filed Dec. 3, 2005, which claims priority to German 10 2004 061 775.9 filed Dec. 22, 2004. The entire contents of the above identified applications are incorporated herein by reference.

TECHNICAL FIELD

The invention concerns a convertible vehicle with a movable rear shelf, which, when the roof is closed, is situated in front of a roof stowage space that is toward the rear relative to the direction of travel, and below a rear window, and which is recessed when the roof is open.

BACKGROUND OF THE INVENTION

EP 0 949 105 A1 discloses a vehicle in which a rear shelf, designated there by the reference number 14, is situated in front of a roof stowage space that is toward the rear in relation to the direction of travel, and below a rear window, and can be recessed along with the roof when it is opened. The rear shelf 14 is rigidly anchored to the rear roof section, therefore when this roof section is in the stowed position, said shelf is disposed nearly vertically, as is shown in FIG. 7. During folding, the forward roof section must maintain sufficient spacing from the rear roof section to avoid colliding with the protruding rear shelf. The stowed roof therefore requires a great deal of vertical stowage space, which decreases the size of the remaining trunk space. This problem is especially serious in side areas of the rear section of the roof located crosswise toward the exterior, since these areas project a considerable distance in the direction of travel when the roof is closed due to the crowning of the rear roof section, thus when the roof is stowed they project as far upward as the entire space between there and the backrest 4 that is to be covered by the rear shelf 14 when the roof is closed.

SUMMARY OF THE INVENTION

The object of the invention is to achieve the simplest and most space-saving shelf for a convertible vehicle that is possible, to be configured as a cover that acts as a rear shelf when the roof is opened.

With the invention, a small stowage size for the roof, which is stowed together with the rear shelf, is enabled. Especially, the vertical stowage space can be kept small, so that, for example, in the case of a two-part roof, the two roof sections can be positioned very tightly against one another, thus forming a flat package.

If the external sections are each capable of pivoting around a single pivoting axis in relation to an element that holds the roof while the roof is being opened, the construction is kept very simple despite the mobility of the exterior sections.

It is especially advantageous for the pivoting movement of the exterior sections during movement of the roof to be effected without a separate drive, so that the additional folding movement increases the structural expenditure and the weight of the vehicle only insignificantly.

In maintaining a small stowage size, it is also very advantageous for the center section of the cover to lie against on a rear section of the roof that encompasses the rear window during opening of the roof. The center section can then be held between the rear section of the roof and a roof section disposed in front of it, where it will not increase the overall thickness of the stowed roof package due to the curvature of the rear roof section.

A simple embodiment of a folding mechanism can be achieved by articulating the outer sections to roof pillars positioned to the sides of a rear window, and configuring them to be acted upon in their sections that face away from the articulated joint by guide elements that are assigned to the center section of the cover. Said guide elements can be configured, for example, as the tops of side arms, which engage under the outer sections allowing them to glide along said tops, which causes them to pivot around their axes of motion.

Alternatively, it is possible for the outer sections to be articulated to the center section so that they can be folded in with the center section via the movement of the roof.

In both cases, the outer sections can lie folded down beneath the center section when the roof is opened.

It is also especially advantageous in terms of a space-saving roof stowage and a control of the folding movement of the outer sections if the roof encompasses fixed roof sections, and if roof pillars positioned to the sides of the rear window are capable of pivoting in during the opening of the roof, around axes that lie at least essentially parallel to the lateral edges of the rear window. With this inward pivoting motion, the roof pillars can then carry the outer sections of the cover along with them, so that when the lateral pillars pivot, said outer sections of the cover are folded down relative to the center section.

Further advantages and characterizing features of the invention are revealed in the exemplary embodiments of the object of the invention that are schematically illustrated in the set of drawings and described in what follows.

DESCRIPTION OF THE PREFERRED EMBODIMENT

The convertible vehicle 1 shown in the set of drawings is configured as a two-seater. At least one rear bench-type seat could also be provided, forming a four- or more passenger vehicle.

The vehicle 1 in this case has a movable roof, which can be stowed in the rear area of the vehicle when opened, and comprises two roof sections 2, 3, one in front of the other, however this configuration is not imperative. The roof sections 2, 3 can each be equipped with at least one rigid frame, or can each form fixed plate sections, wherein the first roof section 3 may also contain a sunroof (not shown).

In the illustrated exemplary embodiment, the rear roof section 3 comprises a rear window 4, to the sides of which are two roof pillars 5, which in this case, as the roof is opening, are capable of pivoting inward relative to the rear window 4, around axes 6 that lie at least nearly parallel to the protruding edges of said window.

The two roof sections 2, 3 in this case can be moved manually or either fully or partially automatically. Additional roof sections may also be connected to one or both roof sections 2, 3, and may be movable in relation to these.

When the roof is closed, an area in front of the rear roof seal 7 and beneath the rear window 4 is covered by a movable cover that is indicated as a unit by the number 8. Thus when the roof is closed, this acts as a sort of rear shelf and at least partially covers the space between the roof seal 7 and a rollover bar or a backrest positioned farther toward the front.

Figure 1:
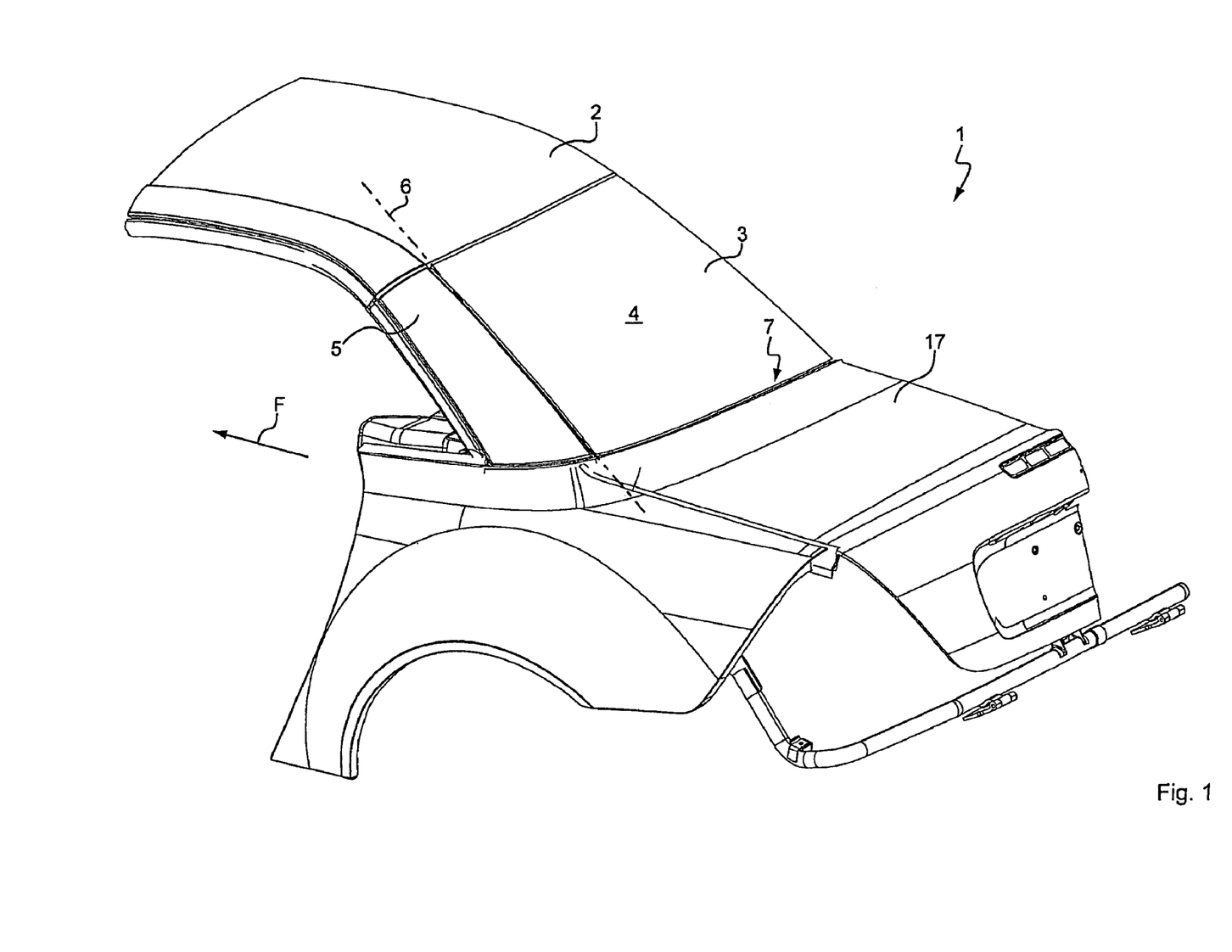
FIG. 1 a schematic, perspective exterior view transversely from the rear of a section of a convertible vehicle according to the invention, with the roof closed, FIG. 2 a similar view to FIG. 1, with a decreased cross-section, a slightly rotated perspective, and a view through the rear window of the sections of a rear shelf in the covered position, FIG. 3 the roof position according to FIG. 2 in a view from above, FIG. 4 a similar view to FIG. 2 at the start of opening the roof, FIG. 5 a similar view to FIG. 3 with the roof position as in FIG. 2, FIG. 6 a similar view to FIG. 4 with the opening of the roof at a more advanced stage, FIG. 7 a similar view to FIG. 5 with the roof position as in FIG. 6, FIG. 8 a similar view to FIG. 4 with the opening of the roof at a more advanced stage, FIG. 9 a similar view to FIG. 7 with the roof position as in FIG. 8, FIG. 10 a similar view to FIG. 4, shortly before completion of opening of the roof, FIG. 11 a similar view to FIG. 9 with the roof position as in FIG. 10, FIG. 12 a similar view to FIG. 4 with the roof completely stowed, FIG. 13 a similar view to FIG. 11, with the roof position as in FIG. 12, FIG. 14 a perspective view, transversely from the front right into the still closed roof of FIG. 1, FIG. 15 a similar view to FIG. 14 into the roof when opening is just beginning, corresponding approximately to the position shown in FIG. 4, FIG. 16 a similar view to FIG. 14 into the roof as opening is proceeding, corresponding approximately to the position shown in FIG. 6, FIG. 17 a similar view to FIG. 14 into the roof when opening is nearly complete, corresponding approximately to the position shown in FIG. 8, FIG. 18 a perspective view transversely from the front left into the roof as opening is proceeding, approximately in the position shown in FIG. 8, FIG. 19 a cross-sectional view of the roof and the cover, along the vertical longitudinal center plane of the vehicle, when the roof is closed, FIG. 20 a similar view to FIG. 19 with a smaller cross-section, corresponding approximately to the detail XX in FIG. 19, but as the roof is starting to open, FIG. 21 a similar view to FIG. 20 with opening of the roof at a more advanced stage, FIG. 22 a similar view to FIG. 21, with the roof almost completely opened.
Figure 2:
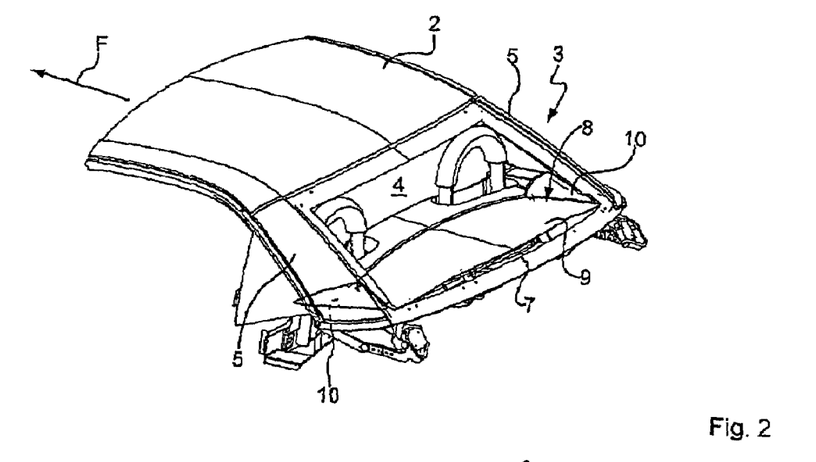
Figure 3:
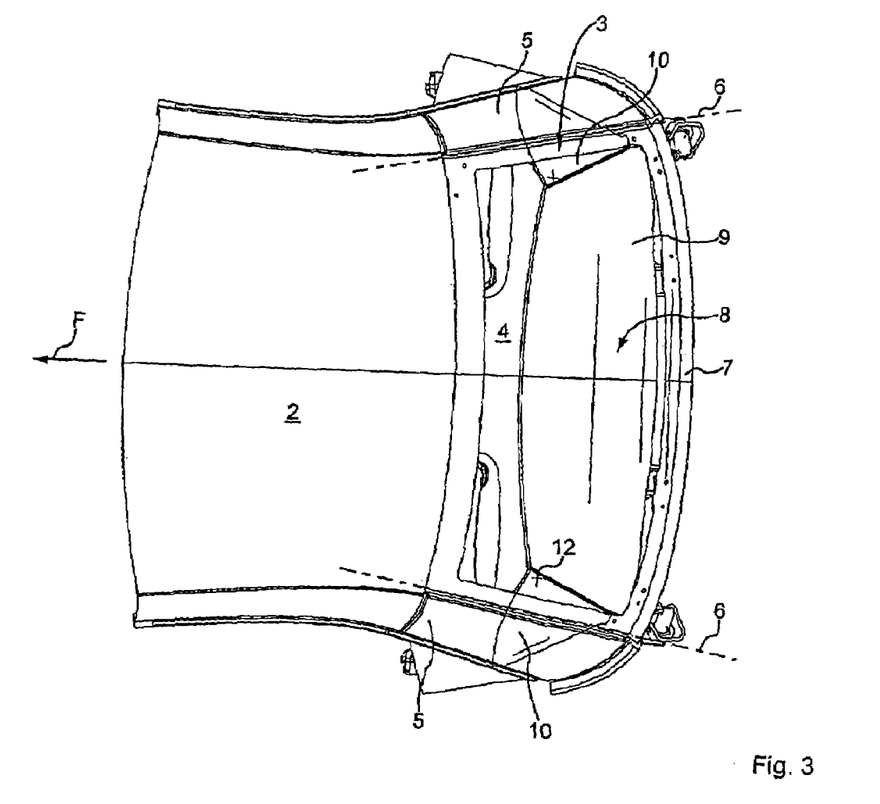
Figure 4:
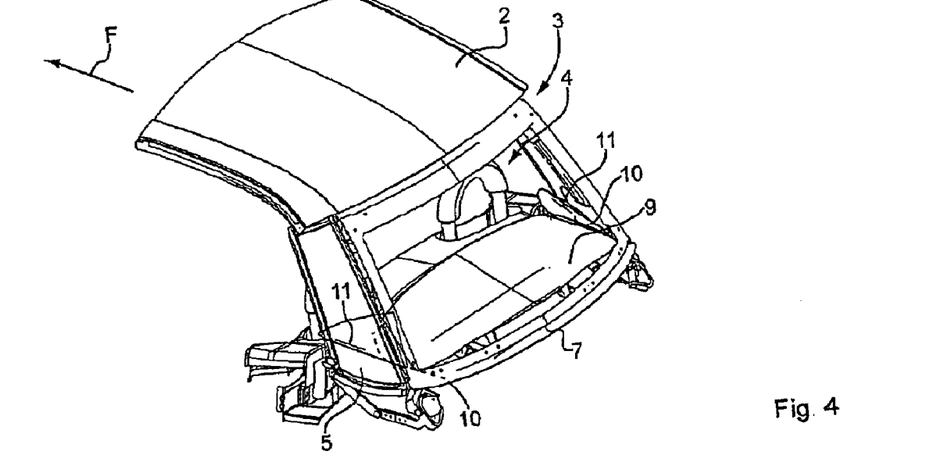
Figure 5:
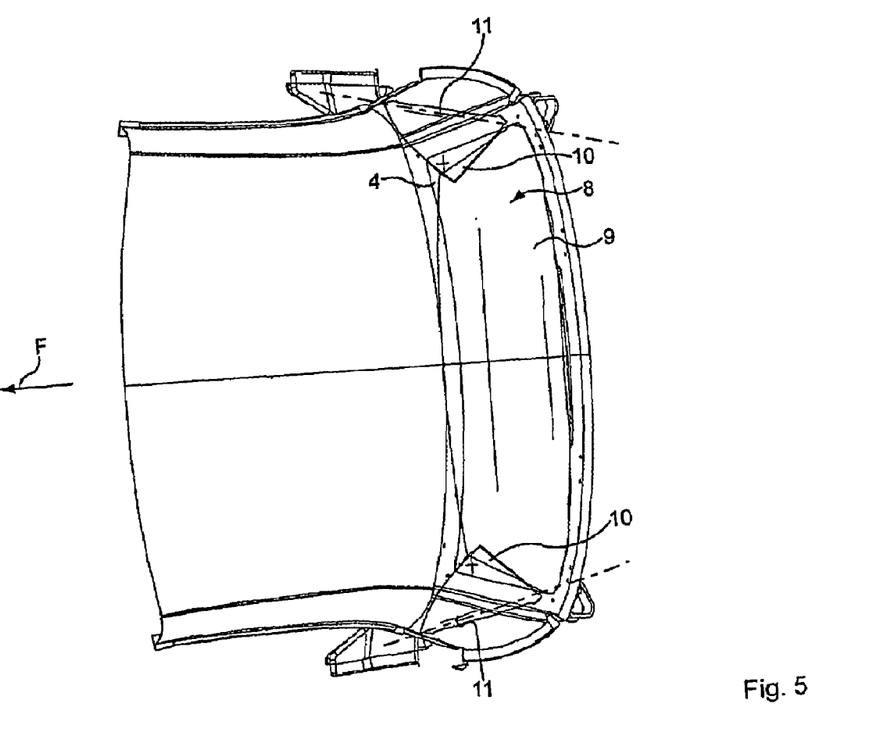
Figure 6:
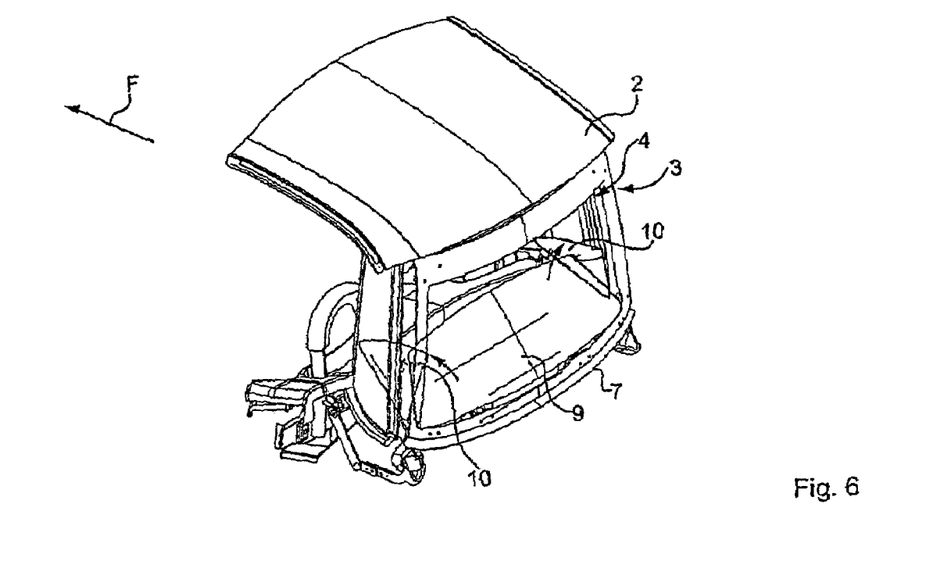
Figure 7:
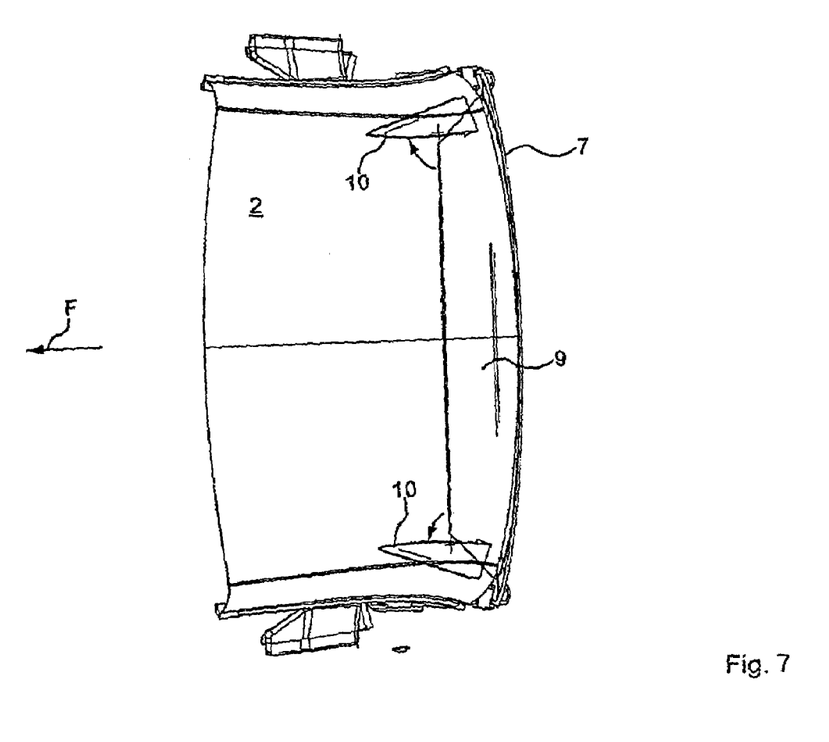
Figure 8:
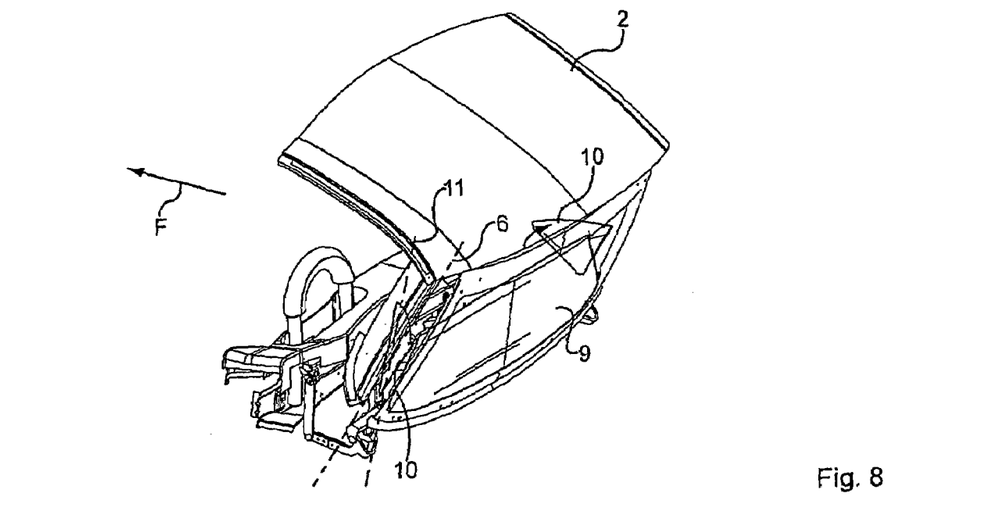
Figure 9:
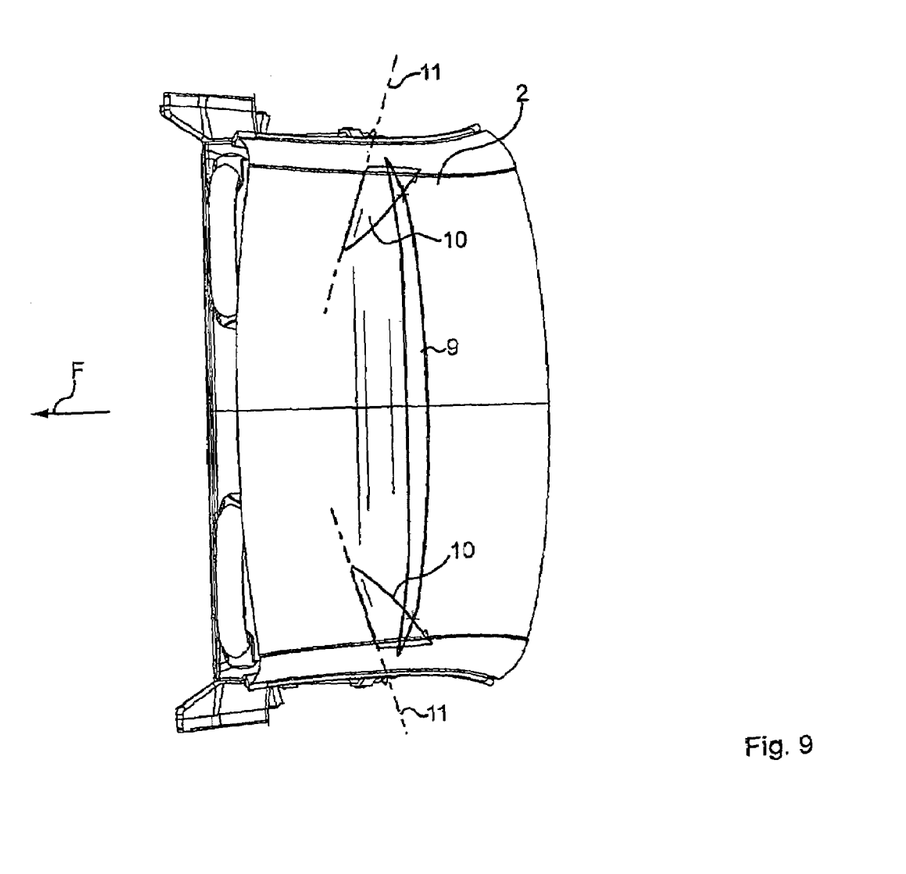
Figure 10:
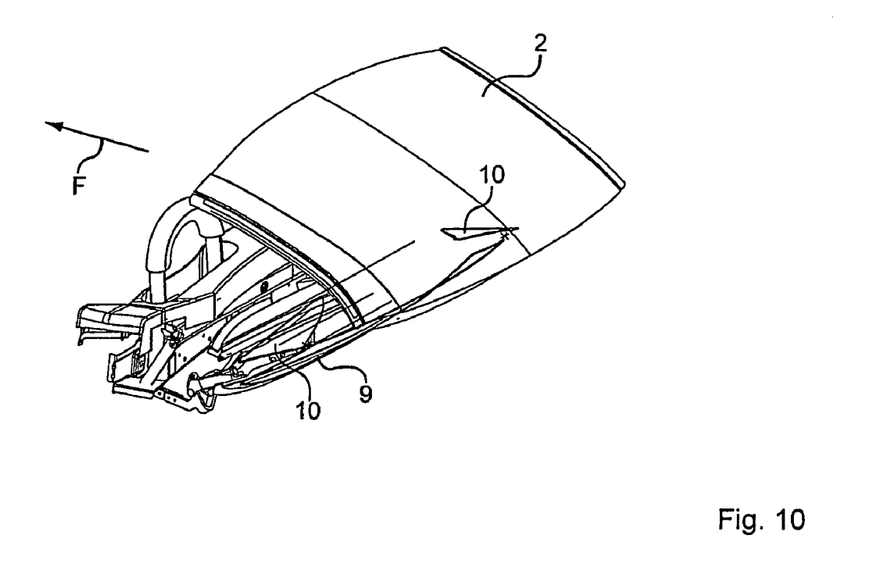
Figure 12:
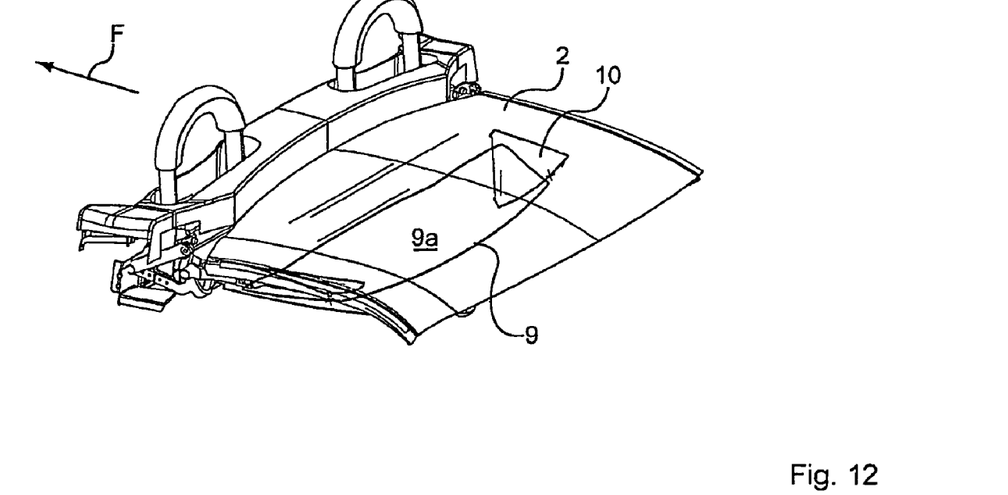
Figure 13:
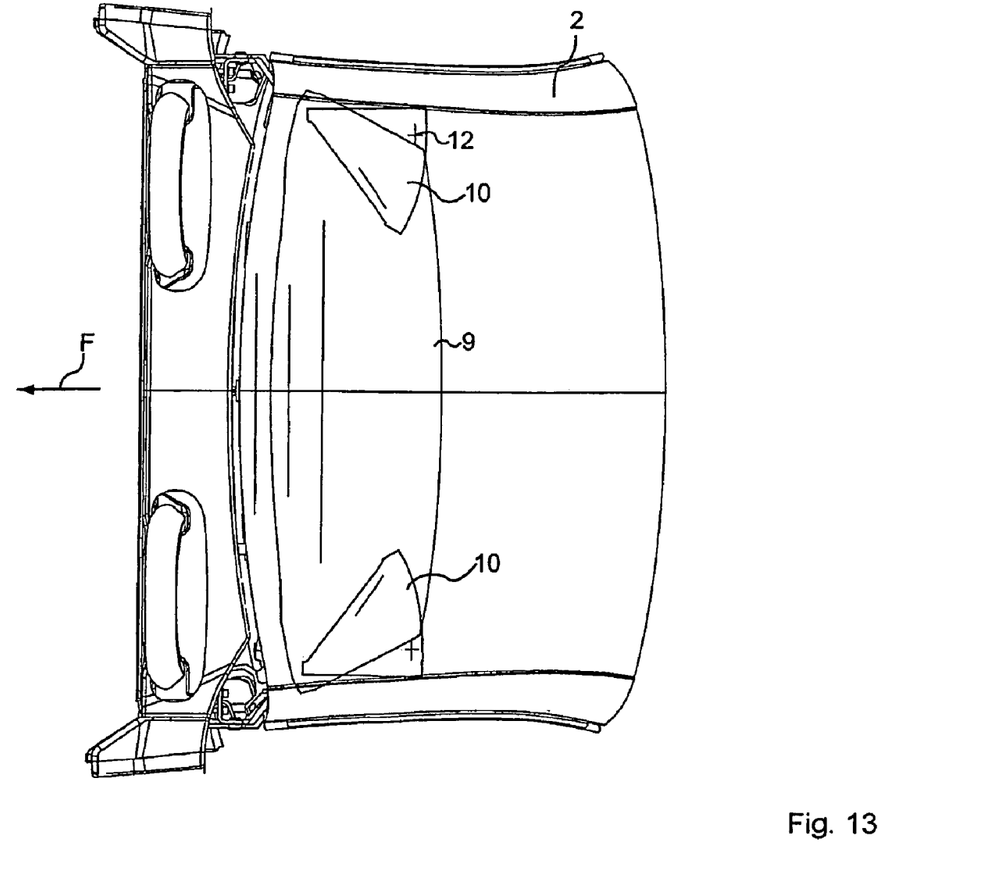
Figure 14:
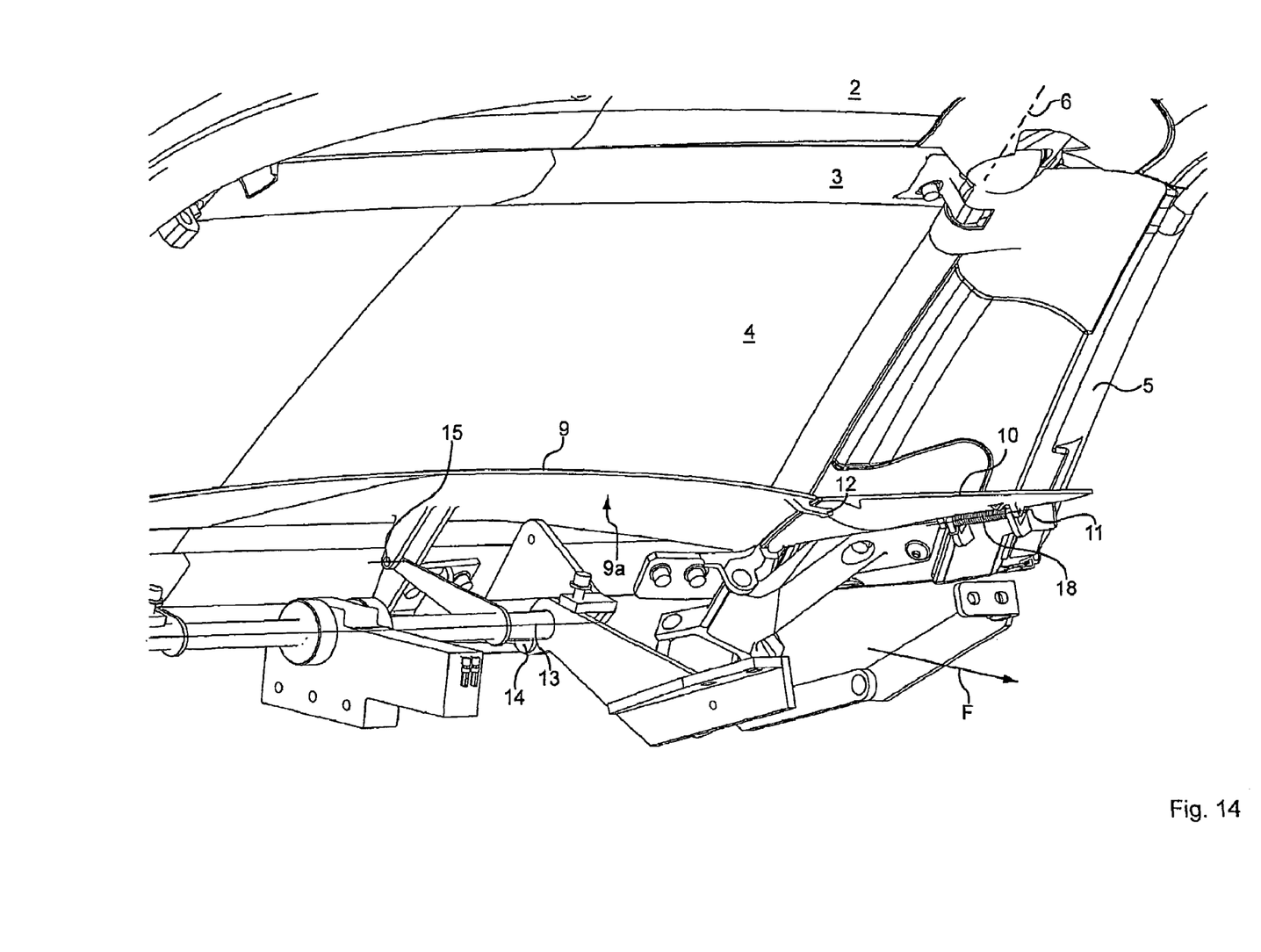
Figure 15:
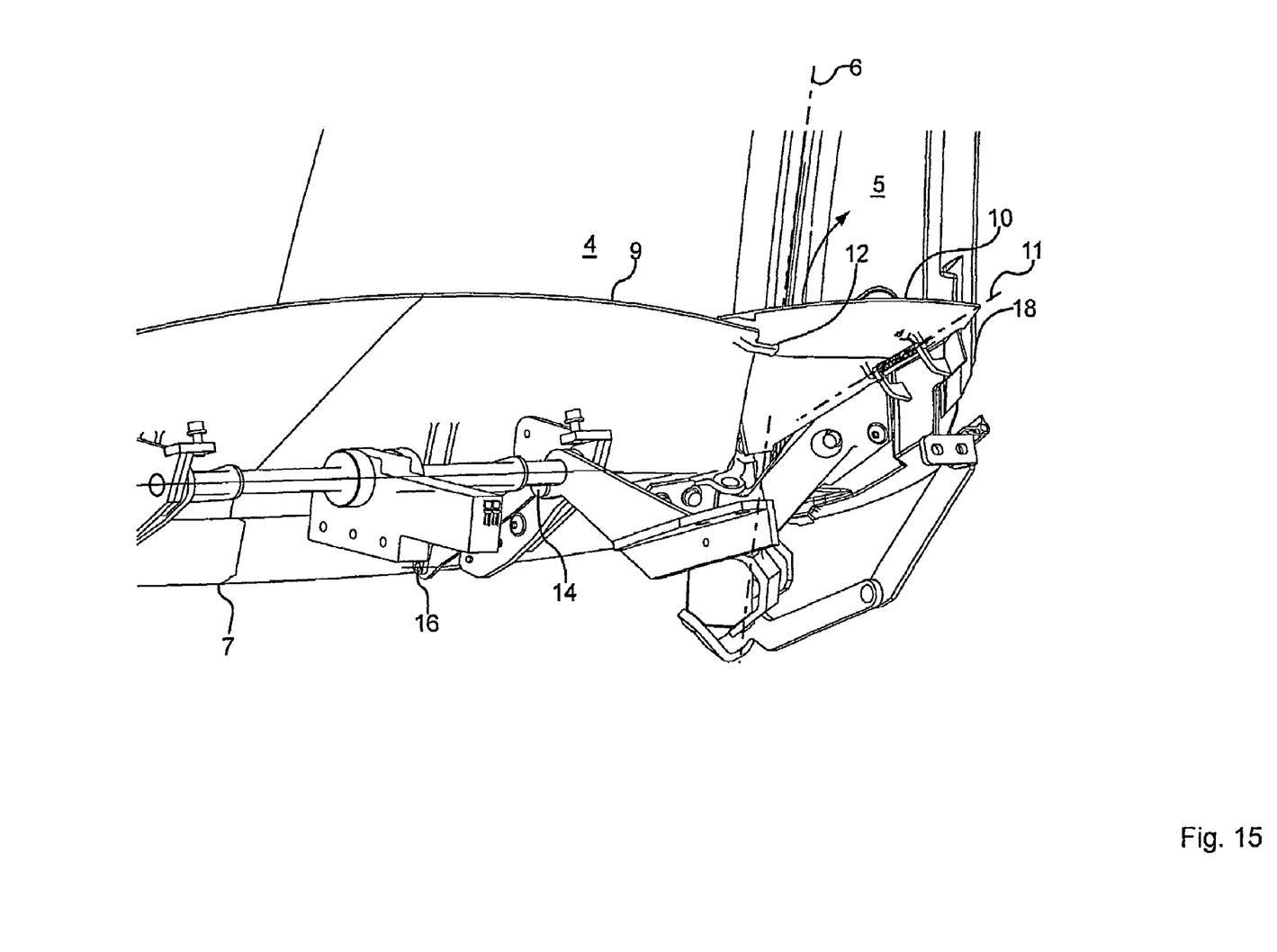
Figure 16:
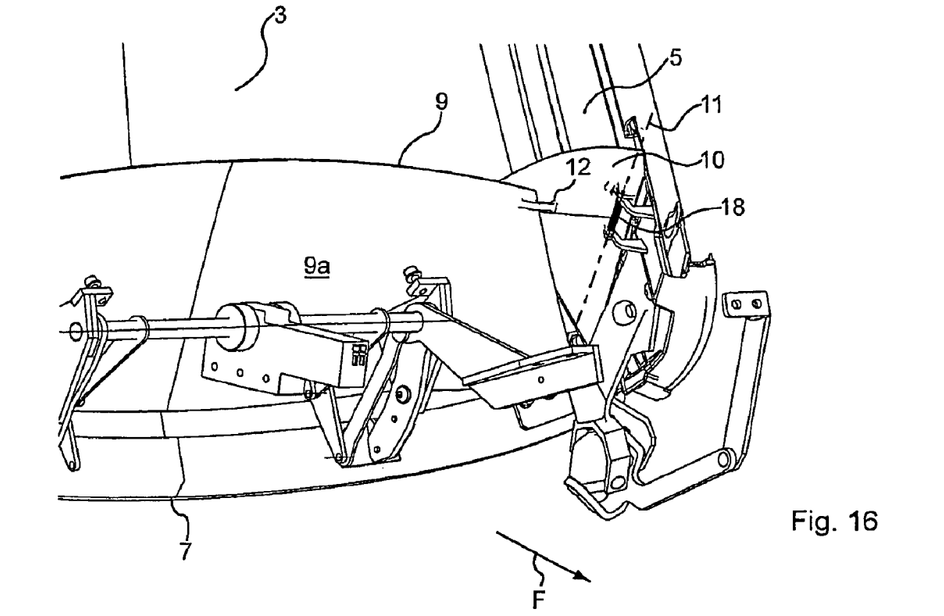

The rear shelf 8 comprises a section 9 positioned at the center relative to the crosswise axis of the vehicle, and, precisely to the sides of this point, two outer sections 10, all of which lie essentially flush against one another when the roof is closed (FIG. 2, 3), and are folded in at least nearly antiparallel relative to the center section 9 when the roof is open (FIG. 12, FIG. 13).

In the exemplary embodiment, the outer sections are articulated to the roof pillars 5 that are capable of rotating in around the axes 6, and are capable of pivoting in relation to these around single pivoting axes 11, with a degree of freedom equal to the relative motion. With the rotation of the pillars 5 during opening of the roof, the axis 11 changes its direction and rotates along with it as a complete unit.

Alternatively, the outer sections 10 could also—not shown—be articulated to the center section 9, with their outward-facing ends in contact with the lateral roof pillars 5, so that the inward rotation of said pillars as the roof is opening causes them to impinge upon the outer sections, thereby folding them down in relation to the center section 9.

In each exemplary embodiment, the folding movement of the outer sections 10 in relation to the center section 9 can be effected without a separate drive and without any control elements, control cables or similar remote force couplings, whereby the construction is substantially simplified, although this is not imperative in principle. Especially, without the ability of the lateral pillars 5 to pivot, a solution comprising supplementary drive or force transmission elements could also be considered. According to the drawings, the pivoting of the outer sections 10 around the axes 11 is effected merely via the direct contact of the outer sections with guide elements 12 provided on side arms of the center section 9. The outer sections 10 rest on these when the roof is closed; when the pillars 5 rotate, they glide along these, which causes them to be raised and to pivot around the moving axes 11 in a folding manner.

The cover 8 is held on a four-bar linkage with axes 13, 14, 15, 16 oriented in the transverse direction of the vehicle, as is shown, for example, in the view of FIGS. 19 through 22, wherein the first axis 13 fixed to the chassis is also the main pivoting axis for the roof in its opening and closing movement. The roof is attached to this via control arms, so that the cover 8 can be mounted to the body framework completely separately from the roof. If adjustable longitudinal holes are provided there, for example, this fine adjustment can be simplified.

The four-bar linkage 13, 14, 15, 16 causes the center section 9 to lie flat against and spaced slightly from the rear window 4 as the roof is being opened, thereby causing it to be lowered along with the rear window. When the roof is open, the cover 8 is therefore not in the covering position, which makes a complicated mechanism for its intermediate lifting during opening of the roof and its subsequent return to a horizontal position unnecessary—wherein different conditions exist for side sections, depending upon whether the roof is closed and sections of the side bars are protruding or whether these lie completely below the breast line of the body. An additional cover for the area that lies in front of the cover section 17 when the roof is opened can be provided and movably fastened, for example to the cover section 17.

Figure 11:
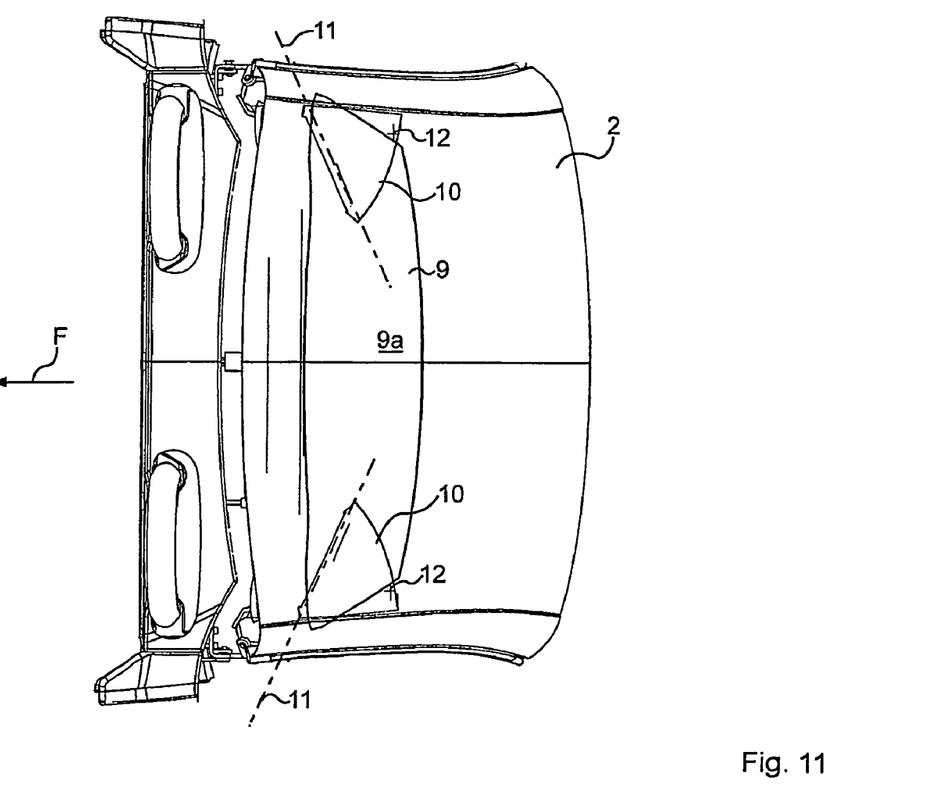
Figure 17:
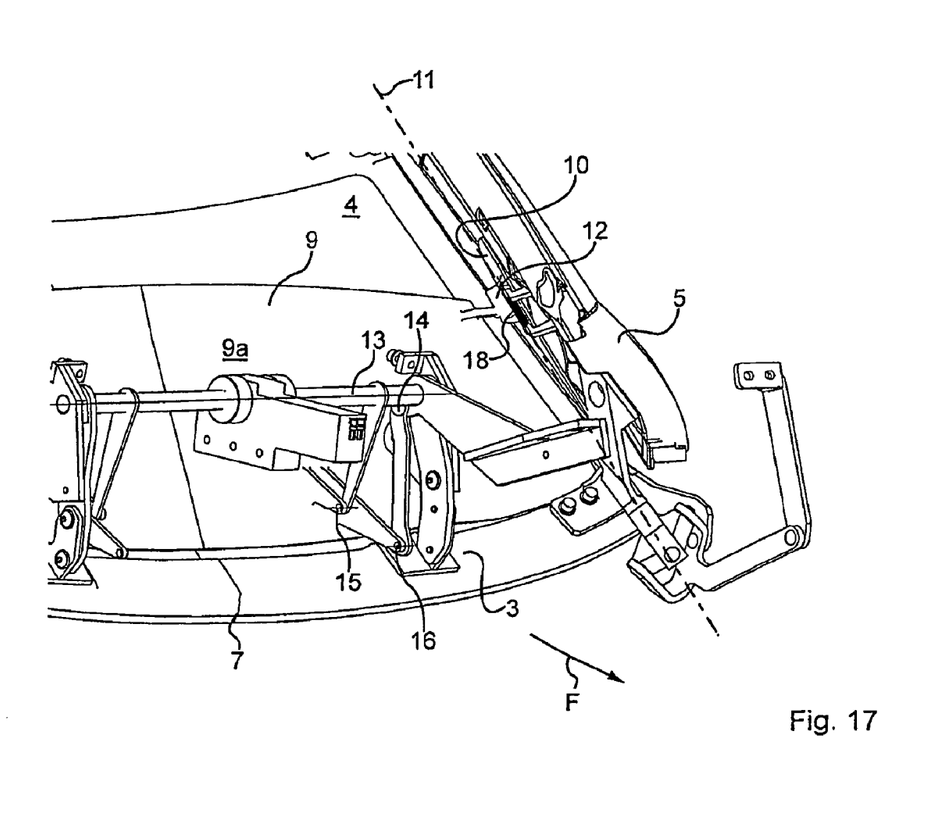
Figure 18:
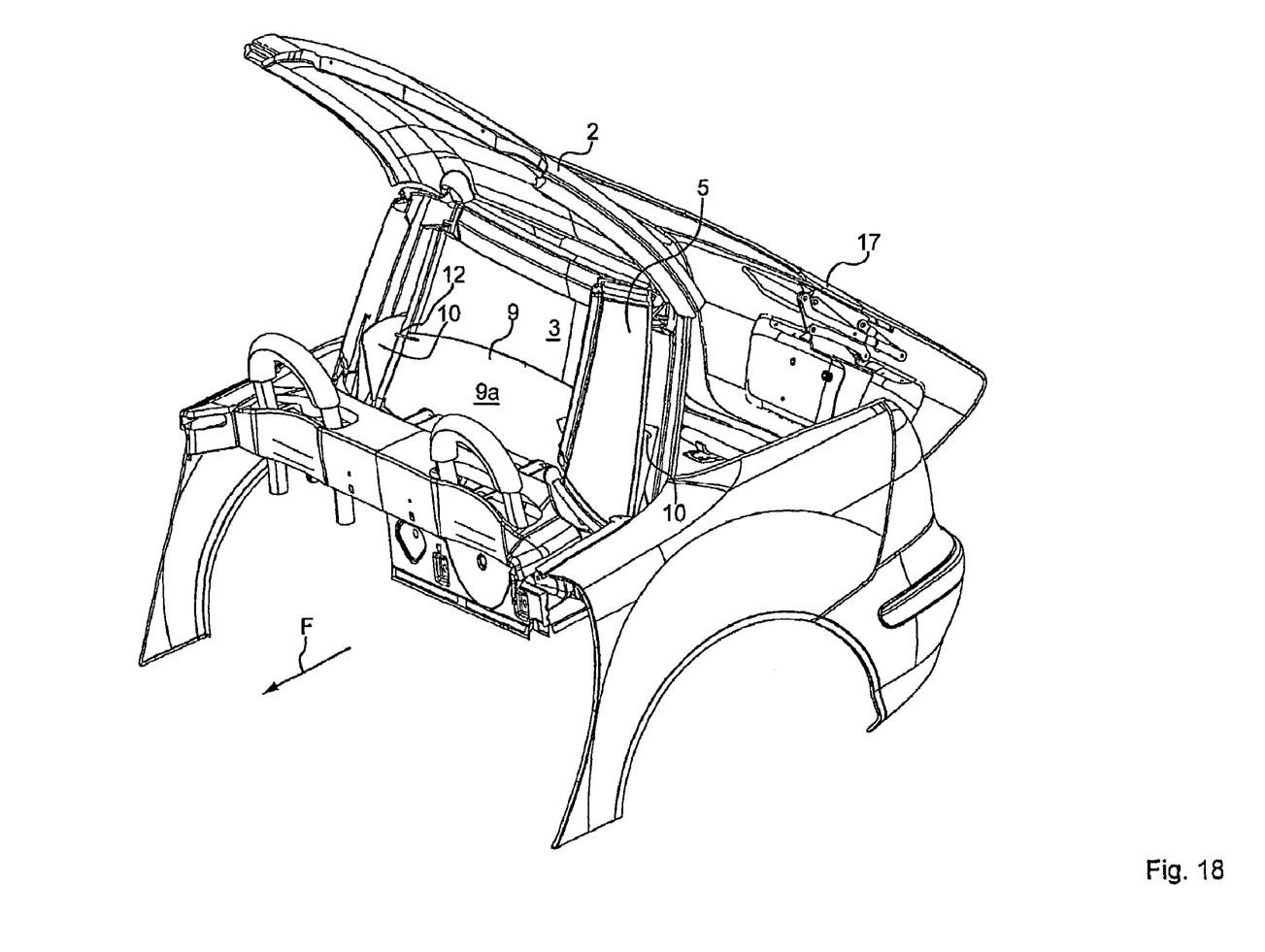
Figure 19:
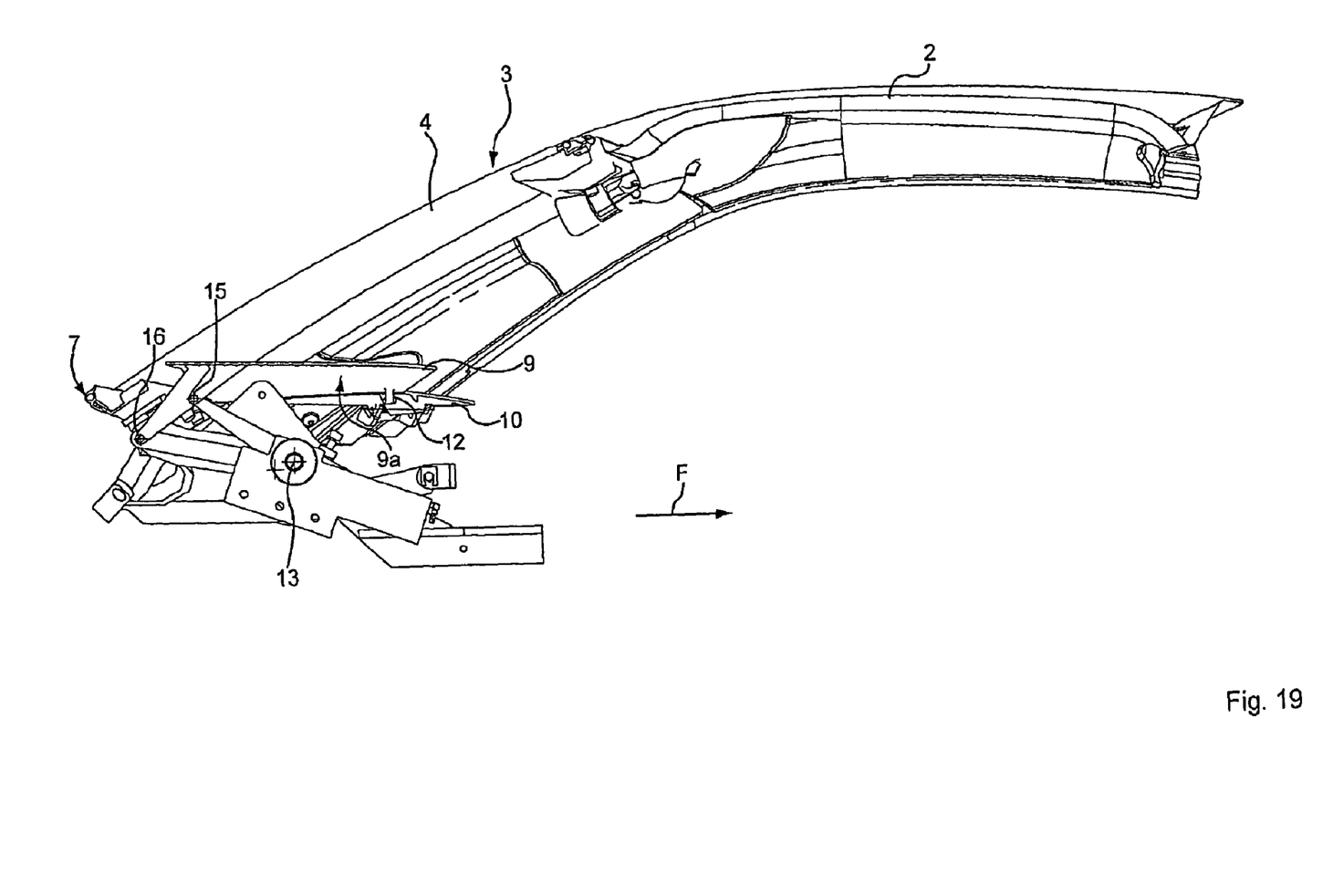
Figure 20:
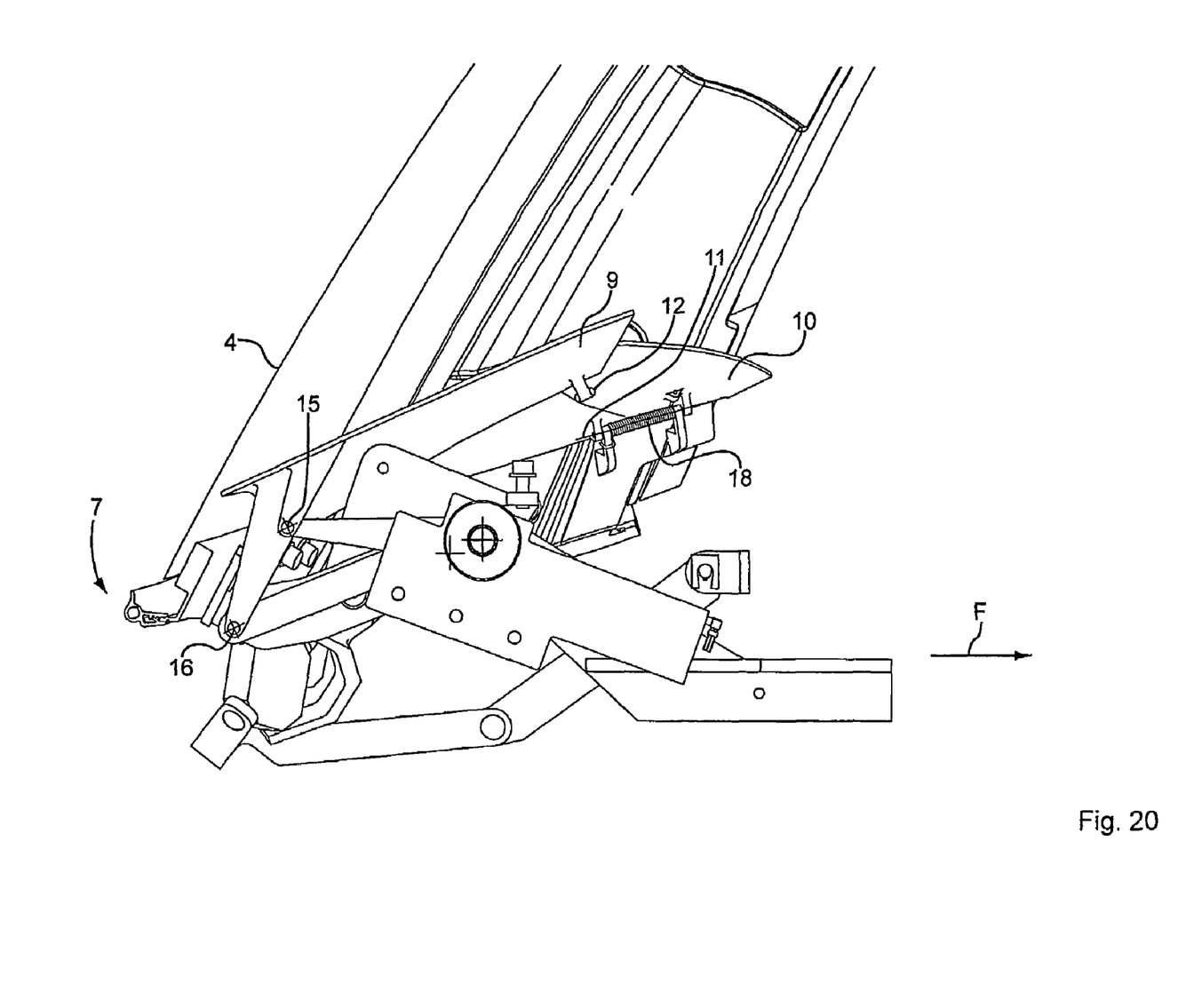
Figure 21:
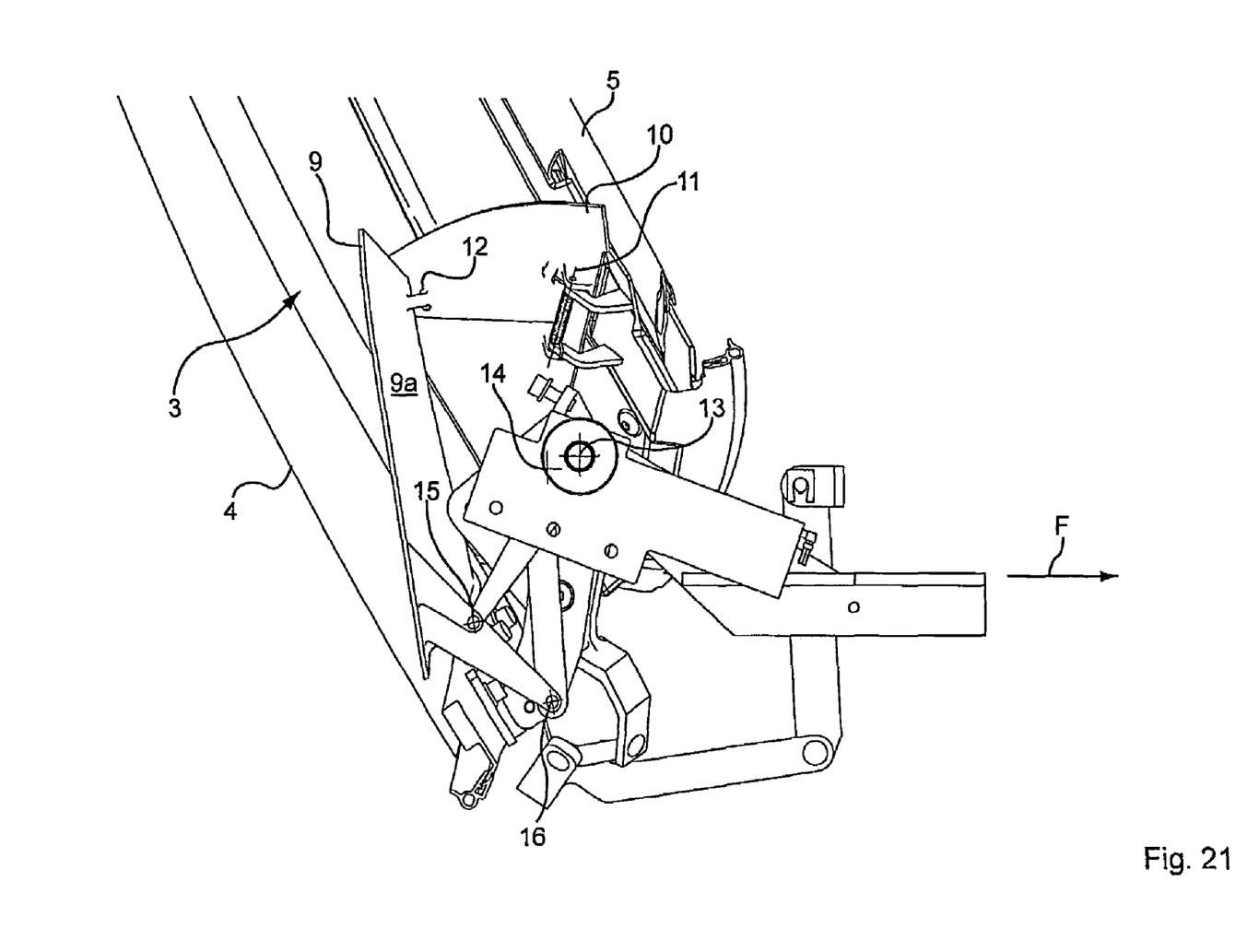
Figure 22:
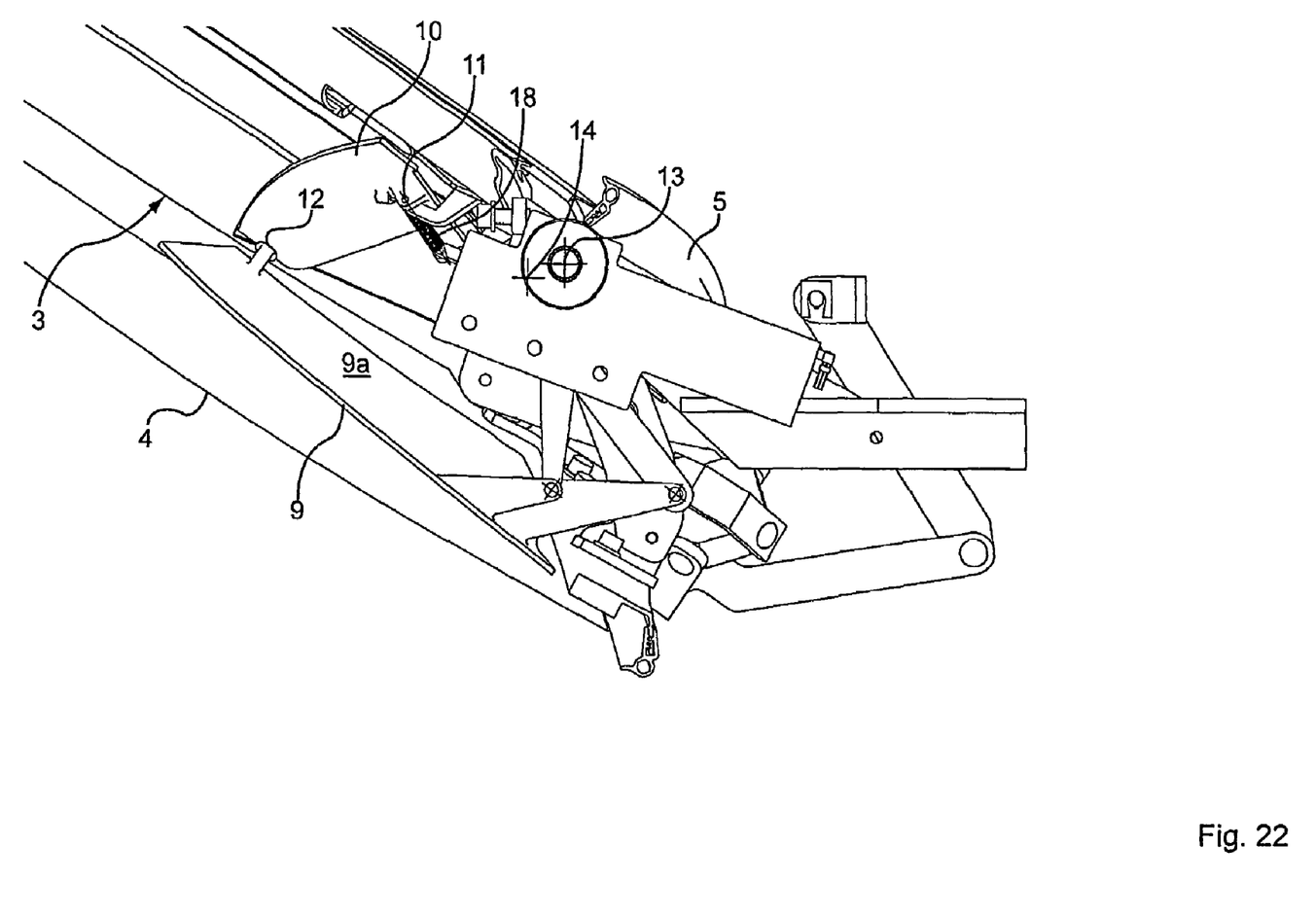

The flat positioning of the center section 9 and the outer sections 10 situated against it on the roof section 3 that encompasses the rear window 4 enables a very small stowage size, so that despite the additional folded-down cover 8, the thickness of the package comprised of the stowed roof sections 2, 3 is not increased. In this, the outer sections 10 lie flat, pivoted inward approximately 180° in a counterclockwise direction in relation to the center section 9 and adjacent to its side 9a that points downward when the roof is closed (FIG. 11, FIG. 13), against the top of which the inwardly rotated roof pillars 5 then rest (FIG. 17, FIG. 22). The front roof section 2 then forms the upper area of the stowed roof.

During the opening movement of the roof, the lateral C-pillars 5 pivot inward around the axes 6, wherein this inward pivoting can be effected by a single primary drive, which can also serve as a drive for folding the roof sections 2, 3 in against one another via upper spherical joints.

In any case, the space remaining for the cover 8 in the transverse axis of the vehicle is decreased, hence the outer sections 10 are pushed along the guide elements 12 that engage under them, over the center section 9, and, because they are also situated on the rear window 4 that is being pivoted toward the rear, they are automatically pivoted upward around the axes 11 against a spring 18 that is forcing them into a cover position. The rotation of the pillars 5 around the axes 6 causes the axes 11 to move around the center section 9 that is pivoting toward the rear, so that at the end, the outer sections lie oriented at least nearly in the opposite direction above the surface 9a of the center section 9. During the entire roof opening movement, and also when the roof is completely opened or completely closed, the outer sections 10 remain in contact with the guide elements 12 of the side arms on one side, and remain impinged upon by the force of the springs 18 in an opposite direction. In this manner at any time a defined position of the outer sections 10 is ensured.

While the best modes for carrying out the invention have been described in detail, those familiar with the art to which this invention relates will recognize various alternative designs and embodiments for practicing the invention within the scope of the appended claims.

The invention claimed is:

1. Convertible vehicle with a roof that is stowable in the rear area of the vehicle, wherein when the roof is closed, an area, in front of a rear roof seal relative to the direction of travel (F) and below a rear window, is at least partially covered by a cover in the manner of a rear shelf, said cover being recessed when the roof is opened, wherein the cover comprises a center section and outer sections situated at each side of the center section in relation to the transverse direction of the vehicle, and which, when the roof is opened, the outer sections of the cover are folded in relative to the center section of the cover to an at least nearly opposite orientation;
   wherein, when the roof is being opened, the center section of the cover rests flat against a rear roof section that encompasses the rear window.

2. Convertible vehicle according to claim 1, wherein, when the roof is being opened, the outer sections each pivot around a single pivoting axis relative to a part that holds them.

3. Convertible vehicle according to claim 2, wherein the pivoting movement of the outer sections is effected automatically via the movement of the roof, without a separate drive.

4. Convertible vehicle according to claim 1, wherein the center section is held on a four-bar linkage with pivoting axes that lie crosswise in relation to the vehicle.

5. Convertible vehicle according to claim 1, wherein the center section is held without direct contact with the roof and is mounted separately from the roof.

6. Convertible vehicle according to claim 1, wherein the outer sections are articulated to roof pillars situated to the sides of a rear window, and are impinged upon at areas of the outer sections that face away from the point of articulation by guide elements allocated to the center section of the cover.

7. Convertible vehicle according to claim 6, wherein, when the roof is closed, the guide elements engage under the outer sections, which are then raised by gliding along said guide elements as the roof is being opened.

8. Convertible vehicle according to claim 1, wherein the outer sections are articulated to the center section and are foldable inwardly relative to the center section via the movement of the roof.

9. Convertible vehicle according to claim 1, wherein, when the roof is opened, the outer sections lie folded in relative to the center section and adjacent to a side of the center section that points downward when the roof is closed.

10. Convertible vehicle according to claim 1, wherein the roof comprises fixed roof sections, and in that, when the roof is being opened, roof pillars situated to the sides of the rear window are pivotable around axes that lie at least essentially parallel to the lateral edges of the rear window.

11. Convertible vehicle according to claim 10, wherein the outer sections are movable by the pivoting of the lateral pillars, which causes the outer sections to fold in relative to the center section.

12. Convertible vehicle with a roof that is stowable in the rear area of the vehicle, wherein when the roof is closed, an area, in front of a rear roof seal relative to the direction of travel (F) and below a rear window, is at least partially covered by a cover in the manner of a rear shelf, said cover being recessed when the roof is opened, wherein the cover comprises a center section and outer sections situated at each side of the center section in relation to the transverse direction of the vehicle, and which, when the roof is opened, the outer sections of the cover are folded in relative to the center section of the cover to an at least nearly opposite orientation;
   wherein the outer sections are articulated to roof pillars situated to the sides of a rear window, and are impinged upon at areas of the outer sections that face away from the point of articulation by guide elements allocated to the center section of the cover.

13. Convertible vehicle according to claim 12, wherein, when the roof is closed, the guide elements engage under the outer sections, which are then raised by gliding along said guide elements as the roof is being opened.

14. Convertible vehicle with a roof that is stowable in the rear area of the vehicle, wherein when the roof is closed, an area, in front of a rear roof seal relative to the direction of travel (F) and below a rear window, is at least partially covered by a cover in the manner of a rear shelf, said cover being recessed when the roof is opened, wherein the cover comprises a center section and outer sections situated at each side of the center section in relation to the transverse direction of the vehicle, and which, when the roof is opened, the outer sections of the cover are folded in relative to the center section of the cover to an at least nearly opposite orientation;
   wherein the roof comprises fixed roof sections, and in that, when the roof is being opened, roof pillars situated to the sides of the rear window are pivotable around axes that lie at least essentially parallel to the lateral edges of the rear window.

15. Convertible vehicle according to claim 14, wherein the outer sections are movable by the pivoting of the lateral pillars, which causes the outer sections to fold in relative to the center section.

* * * * *